(12) United States Patent
Krishnamoorthy et al.

(10) Patent No.: US 11,593,678 B2
(45) Date of Patent: Feb. 28, 2023

(54) GREEN ARTIFICIAL INTELLIGENCE IMPLEMENTATION

(71) Applicant: Bank of America Corporation, Charlotte, NC (US)

(72) Inventors: Madhusudhanan Krishnamoorthy, Chennai (IN); Jayavijay Sarathy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 351 days.

(21) Appl. No.: 16/883,646

(22) Filed: May 26, 2020

(65) Prior Publication Data

US 2021/0374561 A1 Dec. 2, 2021

(51) Int. Cl.
*G06N 5/04* (2006.01)
*G06F 8/30* (2018.01)
*G06N 20/00* (2019.01)
*G06F 11/36* (2006.01)

(52) U.S. Cl.
CPC .............. *G06N 5/04* (2013.01); *G06F 8/30* (2013.01); *G06N 20/00* (2019.01); *G06F 11/3688* (2013.01)

(58) Field of Classification Search
USPC ........................................................ 706/12
See application file for complete search history.

(56) References Cited

U.S. PATENT DOCUMENTS

| | | | |
|---|---|---|---|
| 7,139,740 B2 | 11/2006 | Ayala | |
| 7,317,406 B2 | 1/2008 | Wolterman | |
| 7,801,591 B1 | 9/2010 | Shusterman | |
| 8,145,677 B2 | 3/2012 | Al-Shameri | |
| 8,630,966 B2 | 1/2014 | Gage et al. | |
| 8,660,319 B2 | 2/2014 | Arabi | |
| 8,700,620 B1 | 4/2014 | Lieberman | |
| 8,972,315 B2 | 3/2015 | Szatmary et al. | |
| 8,972,948 B2 | 3/2015 | Weigert | |
| 9,119,551 B2 | 9/2015 | Qi et al. | |
| 9,183,466 B2 | 11/2015 | Siskind et al. | |
| 9,218,563 B2 | 12/2015 | Szatmary et al. | |
| 9,405,427 B2 | 8/2016 | Curtis et al. | |
| 9,414,780 B2 | 8/2016 | Rhoads | |
| 9,613,310 B2 | 4/2017 | Bulbas et al. | |

(Continued)

FOREIGN PATENT DOCUMENTS

| CA | 2780380 C | 1/2016 |
|---|---|---|
| CN | 104137128 B | 12/2018 |

(Continued)

*Primary Examiner* — Qing Chen
*Assistant Examiner* — Clint Thatcher

(57) ABSTRACT

A model designer creates models for machine learning applications while focusing on reducing the carbon footprint of the machine learning application. The model designer can automatically extract features of a machine learning application from requirements documents and automatically generate source code to implement that machine learning application. The model designer then uses computing statistics of previous models and machine learning applications to determine hardware limitations or restrictions to be placed on machine learning application or model. The designer then adds or adjusts the source code to enforce these hardware limitations and restrictions.

17 Claims, 3 Drawing Sheets

(56) References Cited

U.S. PATENT DOCUMENTS

| | | |
|---|---|---|
| 9,697,556 B2 | 7/2017 | Mazed et al. |
| 9,754,371 B2 | 9/2017 | Kateb et al. |
| 9,858,046 B2 | 1/2018 | Weigert et al. |
| 10,113,910 B2 | 10/2018 | Brunk et al. |
| 10,233,902 B2 | 3/2019 | Sia |
| 10,382,848 B2 | 8/2019 | Mazed |
| 10,424,219 B2 | 9/2019 | Simpson et al. |
| 10,498,941 B2 | 12/2019 | Rhoads et al. |
| 10,580,254 B2 | 3/2020 | Shigeta |
| 10,625,593 B2 | 4/2020 | Gillett |
| 2013/0253910 A1 | 9/2013 | Turner et al. |
| 2014/0258195 A1 | 9/2014 | Weng et al. |
| 2014/0278786 A1 | 9/2014 | Liu-Qiu-Yan |
| 2014/0313303 A1 | 10/2014 | Davis et al. |
| 2015/0035440 A1 | 2/2015 | Spero |
| 2016/0047662 A1 | 2/2016 | Ricci |
| 2016/0150213 A1 | 5/2016 | Mutti et al. |
| 2017/0013188 A1 | 1/2017 | Kothari |
| 2017/0132496 A1 | 5/2017 | Shoaib et al. |
| 2017/0258390 A1 | 9/2017 | Howard |
| 2017/0313248 A1 | 11/2017 | Kothari |
| 2017/0316487 A1 | 11/2017 | Mazed |
| 2018/0014485 A1 | 1/2018 | Whitcher et al. |
| 2018/0046869 A1 | 2/2018 | Cordell et al. |
| 2018/0242429 A1 | 8/2018 | Ashdown et al. |
| 2018/0347406 A1 | 12/2018 | Friesth |
| 2019/0250891 A1* | 8/2019 | Kumar ................. G06K 9/6218 |
| 2019/0370069 A1* | 12/2019 | Swadling ............. G06F 9/5016 |
| 2020/0151609 A1* | 5/2020 | Ambardekar ......... H04L 47/127 |
| 2021/0132915 A1* | 5/2021 | Ivankovic ................. G06F 8/40 |
| 2021/0357207 A1* | 11/2021 | Copty ................. G06K 9/6268 |

FOREIGN PATENT DOCUMENTS

| | | |
|---|---|---|
| CN | 105393252 B | 4/2019 |
| CN | 104995650 B | 6/2019 |
| EP | 2438755 B1 | 9/2015 |
| EP | 2783549 B1 | 11/2017 |
| ES | 2713984 T | 5/2019 |
| KR | 100702613 B1 | 3/2007 |
| KR | 20170000752 A | 1/2017 |

* cited by examiner

GREEN ARTIFICIAL INTELLIGENCE IMPLEMENTATION

TECHNICAL FIELD

This disclosure relates generally to model design for machine learning applications.

BACKGROUND

Machine learning applications apply models to make predictions.

SUMMARY OF THE DISCLOSURE

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions. A primary task in developing a machine learning application is creating and training the model.

Machine learning applications may be extremely resource intensive applications. They may require an excessive amount of processor, memory, and/or network resources to execute properly. The computers and servers that house these resources may also generate lots of heat while executing the machine learning applications. As a result, large and expansive heat removal systems may also be used to cool these computers and servers. All of these factors contribute to machine learning applications generating a large carbon footprint (e.g., consuming and wasting lots of energy), which has a negative impact on the environment.

This disclosure contemplates a model designer that creates models for machine learning applications while focusing on reducing the carbon footprint of the machine learning application. The model designer can automatically extract features of a machine learning application from requirements documents and automatically generate source code to implement that machine learning application. The model designer then uses computing statistics of previous models and machine learning applications to determine hardware limitations or restrictions to be placed on machine learning application or model. The designer then adds or adjusts the source code to enforce these hardware limitations and restrictions. Certain embodiments are described below.

According to an embodiment, an apparatus includes a memory and a hardware processor communicatively coupled to the memory. The hardware processor parses a document to extract features of the document and generates source code for a machine learning model based on the extracted features. The hardware processor also retrieves, from a database, computing statistics for executing previous machine learning models and determines, based on the computing statistics, a hardware restriction for a portion of the source code. The hardware processor then adds the hardware restriction to the portion of the source code such that the hardware restriction is enforced when the portion of the source code is executed.

According to another embodiment, a method includes parsing, by a hardware processor communicatively coupled to a memory, a document to extract features of the document and generating, by the hardware processor, source code for a machine learning model based on the extracted features. The method also includes retrieving, by the hardware processor and from a database, computing statistics for executing previous machine learning models and determining, by the hardware processor and based on the computing statistics, a hardware restriction for a portion of the source code. The method further includes adding, by the hardware processor, the hardware restriction to the portion of the source code such that the hardware restriction is enforced when the portion of the source code is executed.

According to another embodiment, a system includes a database and a model designer that includes a hardware processor communicatively coupled to a memory. The hardware processor parses a document to extract features of the document and generates source code for a machine learning model based on the extracted features. The hardware processor retrieves, from the database, computing statistics for executing previous machine learning models and determines, based on the computing statistics, a hardware restriction for a portion of the source code. The hardware processor then adds the hardware restriction to the portion of the source code such that the hardware restriction is enforced when the portion of the source code is executed.

Certain embodiments provide one or more technical advantages. For example, an embodiment automatically generates source code to implement a machine learning model. As another example, an embodiment automatically generates source code with built-in hardware restrictions to limit the carbon footprint resulting from executing that source code. As yet another example, an embodiment trims portions of the logit layer of a machine learning model to reduce the carbon footprint of applying that model. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
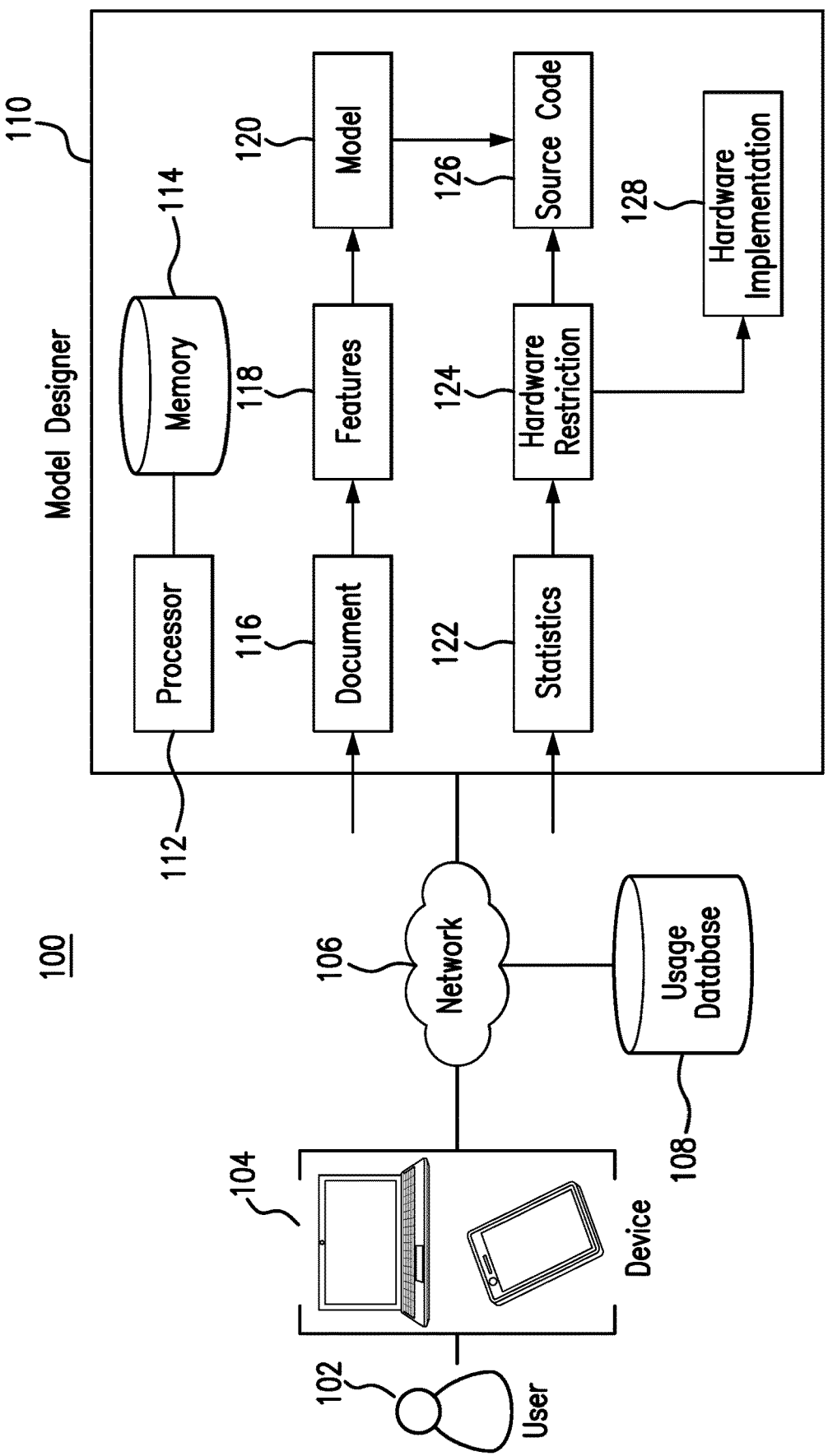
FIG. 1 illustrates an example system.
Figure 2:
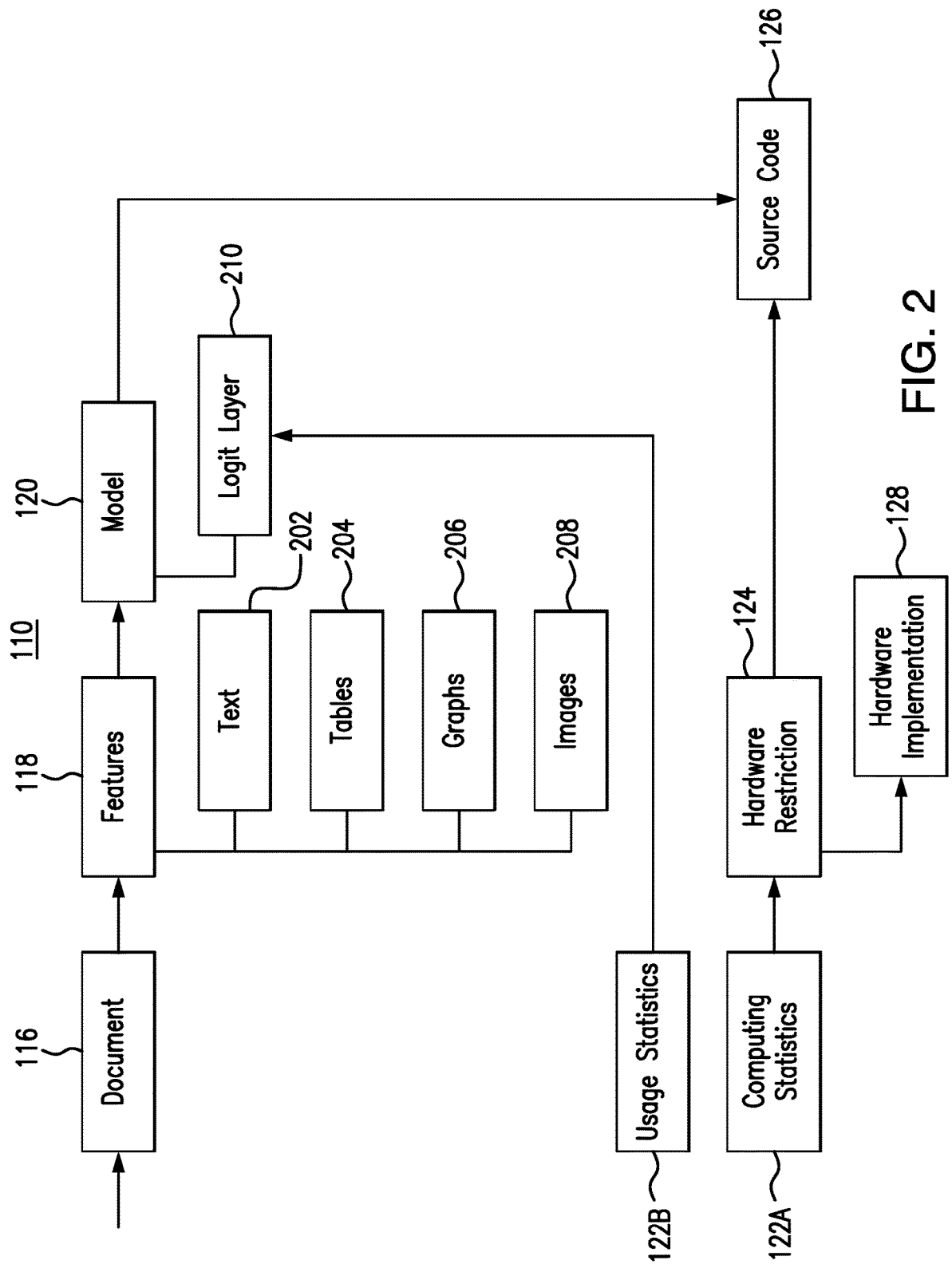
FIG. 2 illustrates an example model designer of the system of FIG. 1.
Figure 3:
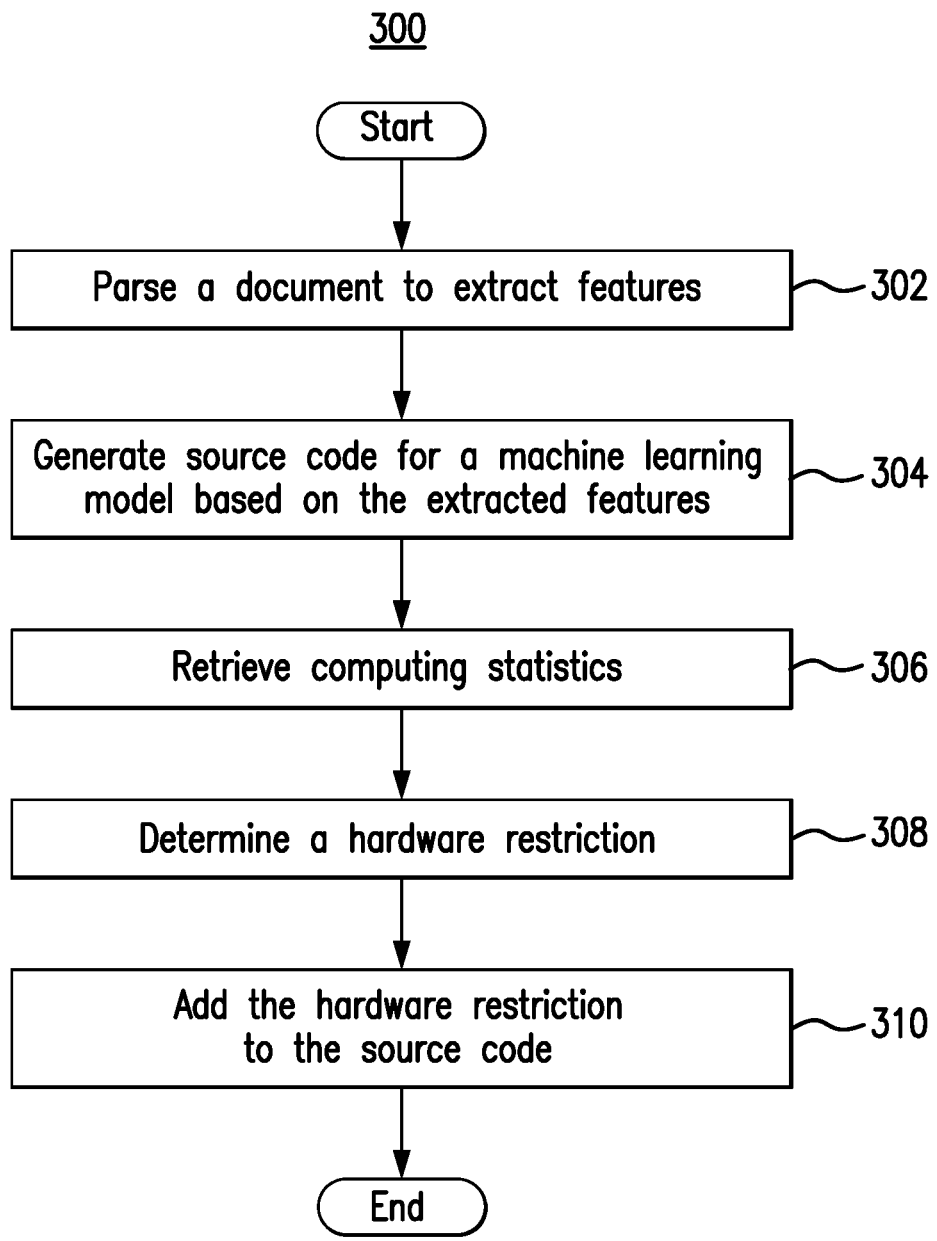
FIG. 3 is a flowchart illustrating a method for generating models using the system of FIG. 1.

Embodiments of the present disclosure and its advantages are best understood by referring to FIGS. 1 through 3 of the drawings, like numerals being used for like and corresponding parts of the various drawings.

Machine learning applications apply models to input data to make predictions that may have profound impacts on the world or in the lives of users. Generally, a machine learning application maps values from an input domain into an output range for a target variable. The mapping is usually not deterministic or represented using a mathematic formula. Rather, the mapping may be understood as a learned behavior from the input data which models the output target variable. These mappings are also understood as predictions. A primary task in developing a machine learning application is creating and training the model.

Machine learning applications may be extremely resource intensive applications. They may require an excessive amount of processor, memory, and/or network resources to execute properly. The computers and servers that house these resources may also generate lots of heat while executing the machine learning applications. As a result, large and expansive heat removal systems may also be used to cool these computers and servers. All of these factors contribute to machine learning applications generating a large carbon footprint (e.g., consuming and wasting lots of energy), which has a negative impact on the environment.

This disclosure contemplates a model designer that creates models for machine learning applications while focusing on reducing the carbon footprint of the machine learning application. The model designer can automatically extract features of a machine learning application from requirements documents and automatically generate source code to implement that machine learning application. The model designer then uses computing statistics of previous models and machine learning applications to determine hardware limitations or restrictions to be placed on a machine learning application or model. The designer then automatically adds or adjusts the source code to enforce these hardware limitations and restrictions.

A practical application of the model designer is that the model designer automatically generates source code that implements a machine learning model while reducing the carbon footprint of executing that source code. In this manner, the source code has less impact on the environment making the source code a "greener" machine learning solution. The system will be described in more detail using FIGS. 1 through 3.

FIG. 1 illustrates an example system 100. As seen in FIG. 1, system 100 includes one or more devices 104, a network 106, a usage database 108, and a model designer 110. Generally, model designer 110 automatically designs and creates models for machine learning applications with a focus on reducing the carbon footprint of the machine learning application. In particular embodiments, the models and/or machine learning applications created by model designer 110 are designed to consume less energy during execution, thereby improving the environmental impact of the machine learning application.

Users 102 use devices 104 to interact and communicate with other components of system 100. For example, user 102 may use one or more devices 104 to create requirements documents that describe the function and purpose of a machine learning application. Model designer 110 may use these documents to automatically design and implement models for machine learning applications. As another example, users 102 may use one or more devices 104 to execute machine learning applications. The machine learning applications may execute directly on devices 104, or devices 104 may instruct another component of system 100 to execute the machine learning applications. Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Usage database 108 stores statistics related to the execution of machine learning application. For example, usage database 108 may store computing statistics that track the amount of computing resources used by portions of different machine learning applications and/or models. These statistics may track the consumption of resources (e.g., processor resources, memory resources, and/or network resources). These statistics may provide insight into the overall energy usage of a portion of a machine learning application. Model designer 110 may use these computing statistics to determine hardware restrictions for various portions of a machine learning application. The hardware restrictions may limit the energy consumption of the hardware used to execute certain portions of a machine learning application, which may reduce the carbon footprint of the machine learning application in certain embodiments. As another example, usage database 108 may include usage statistics that track the frequency that different portions of various machine learning applications or models are used. These statistics may provide insight as to which portions of a machine learning application or model are used more than others. Model designer 110 may use these usage statistics to determine which portions of a machine learning application can be removed and/or replaced to improve the energy consumption associated with those portions of the machine learning application, which may reduce the carbon footprint of the machine learning application in certain embodiments.

Model designer 110 automatically designs and implements models for machine learning applications. In particular embodiments, model designer 110 reduces the carbon footprint of machine learning applications by reducing the energy consumption associated with executing the machine learning applications. As seen in FIG. 1, model designer 110 includes a processor 112 and a memory 114. Processor 112 and memory 114 may be configured to perform any of the functions and actions of model designer 110 described herein.

Processor 112 is any electronic circuitry, including, but not limited to microprocessors, application specific integrated circuits (ASIC), application specific instruction set processor (ASIP), and/or state machines, that communicatively couples to memory 114 and controls the operation of model designer 110. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of model designer 110 by processing information received from devices 104, network 106, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data, operational software, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

Model designer 110 receives and analyzes document 116 to determine the requirements of a model for a machine learning application. Model designer 110 may receive document 116 from devices 104. Document 116 may include a description of a machine learning application. Document 116 may further include requirements for the machine learning application such as, for example, its purpose, the dataset that the machine learning application will use, and/or the desired accuracy of the machine learning application. Model designer 110 may parse document 116 to learn the various requirements of the machine learning application. Document 116 may be in any suitable format such as, for example, text, document, and/or portable document format.

Model designer 110 may extract features 118 from document 116 by parsing document 116. Features 118 may include any suitable portion of document 116. For example, features 118 may include text, tables, graphs, and/or images contained within document 116. Model designer 110 may analyze features 118 to determine the various requirements of a model for a machine learning application. For example, text may describe the purpose and/or desired accuracy of the machine learning application. As another example, tables, graphs, and images may describe the purpose and/or intended results of the machine learning application. Model designer 110 may analyze these features to automatically determine what kind of model and/or machine learning application to design and implement.

Model designer 110 automatically generates a machine learning model 120 based on features 118. Model 120 may be applied by a machine learning application to make output predictions based on input data. Model designer 110 may design any appropriate model 120, according to features 118. Model 120 may then be applied by a machine learning application to make output predictions.

After designing model 120, model designer 110 may automatically generate source code 126 that implements model 120 and/or a machine learning application. Source code 126 may be the source code for the machine learning application. Source code 126 may be executed by a machine or device, such as device 104, to execute the functions of the machine learning application and/or to apply model 120 to input data to make output predictions. Model designer 110 may improve the carbon footprint associated with executing source code 126 by intelligently adding certain restrictions into source code 126 that do not prevent source code 126 from performing its intended purposes.

Model designer 110 may retrieve statistics 122 from usage database 108. As explained previously, statistics 122 may include computing statistics that provide insight into the types and amounts of computing resources used by machine learning applications. Model designer 110 may analyze statistics 122 to determine a hardware restriction 124. For example, model designer 110 may determine that certain portions of machine learning applications can be executed using reduced processor, memory, and/or network resources. As another example, model designer 110 may determine that a certain amount of processor, memory, and/or network resources are wasted when certain amounts of processor, memory, and/or network resources are provided for a machine learning application. Model designer 110 may determine that the amount of available processor, memory, and/or network resources available to certain portions of machine learning applications may be reduced and still preserve the functions and efficiency of the portion of the machine learning application. As a result, model designer 110 may determine and implement hardware restriction 124. In certain embodiments, model designer 110 may implement hardware restriction 124 by adding hardware restriction 124 into source code 126. Model designer 110 may add hardware restriction 124 to source code 126 by reconfiguring, changing, and/or editing source code 126 to include the hardware restriction 124. As a result, when certain portions of source code 126 are executed, the hardware restriction 124 is enforced on the execution of source code 126, thereby limiting the amount of processor, memory, and/or network resources used to execute source code 126. Source code 126 may be adjusted so that hardware restriction 124 is enforced only for a portion of source code 126 and/or model 120. In certain embodiments, by limiting the hardware resources consumed when executing source code 126, the carbon footprint of executing source code 126 is reduced.

In particular embodiments, model designer 110 may further determine a recommended hardware implementation 128 based on hardware restrictions 124. For example, if hardware restrictions 124 limit the processor speed, available memory, and/or available bandwidth, model designer 110 may recommend specifications for hardware, memory, and/or network resources that fulfill the hardware restriction 124. The recommended hardware implementation 128 may be more efficient when executing on reduced resources, thereby reducing the carbon footprint of executing source code 126. In certain embodiments, hardware implementation 128 may include a recommended processor, a recommended memory, and/or a recommended network component.

FIG. 2 illustrates an example model designer 110 of the system 100 of FIG. 1. In particular embodiments, model designer 110 improves the carbon footprint of a machine learning application by automatically designing a model 120 for the machine learning application that reduces the computing resources consumed while executing the machine learning application. In this manner, the environmental impact of the machine earning application is reduced.

Model designer 110 receives and analyzes document 116 to determine the requirements for a model 120 and/or a machine learning application. Document 116 may describe the intended purposes and results of the machine learning application by analyzing document 116. Model designer 110 may determine the contours and requirements of model 120 and/or the machine learning application from document 116.

Model 110 parses document 16 to extract one or more features 118 from document 116. Features 118 may include any suitable component of document 116. For example, features 118 may include text 202, tables 204, graphs 206, and/or images 208. Each of these features 118 may be included in document 116. By parsing document 116, model designer 110 may recognize and extract one or more of these features 118 from document 116. Model designer 110 may then analyze these features 118 to determine the requirements for a model 120 and/or for a machine learning application.

Model designer 110 analyzes features 118 to determine an appropriate model 120. For example, features 118 may indicate an intended purpose or a desired accuracy for a machine learning application. Features 118 may specify an input dataset to be used to train a machine learning application. Model designer 110 may consider each of these features 118 and automatically design a model 120 that fulfills the various requirements in features 118. A machine learning application may apply model 120 to make output predictions based on input data.

Model designer 110 may then automatically generate source code 126 that implements and applies model 120. Source code 126 may be the source code for a machine learning application that applies model 120. Source code 126 may be any appropriate or suitable programming language. In particular embodiments, model designer 110 may select a programming language for source code 126 that improves the efficiency of source code 126 in performing the desired tasks of the machine learning application.

Model designer 110 may retrieve computing statistics 122A from usage database 108. Computing statistics 122A may track the amount of computing resources used by various portions of machine learning applications. Model designer 110 may determine, based on computing statistics 122A, the computing requirements of various portions of source code 126 and/or a machine learning application.

Model designer 110 may determine hardware restrictions 124 based on computing statistics 122A. Hardware restrictions 124 may indicate the restrictions that can be put on hardware while executing various portions of source code 126 while maintaining the functionality and efficiency of source code 126. Model designer 110 may add these hardware restrictions 124 to source code 126. For example, model designer 110 may add source code to source code 126 that implements hardware restrictions 124. When various portions of source code 126 are executed, the additional source code imposes restrictions on the hardware usage while executing those portions of source code 126. For example, hardware restrictions 124 may limit the processor speed or capacity, the memory speed or capacity, and/or the network bandwidth when executing certain portions of source code 126. In this manner, processor, memory, and/or network resources are restricted when executing certain portions of source code 126. Although this hardware may be limited while executing these portions of source code 126, the functionality and efficiency associated with executing source code 126 may not be reduced in certain embodiments. As a result, the performance of source code 126 is maintained but the resources that are consumed when executing source code 126 are reduced. In this manner, the carbon footprint associated with executing source code 126 are reduced.

In particular embodiments, hardware restriction 124 may further be added to model 120. For example, various nodes of model 120 may be adjusted to include hardware restrictions 124. In this manner, model 120 may also provide a visual representation of hardware restriction 124 when model 120 is viewed by a user. Model designer 110 may then build these hardware restrictions 124 into source code 126 when automatically generating source code 126 from model 120.

In certain embodiments, model designer 110 may further generate a recommended hardware implementation 128 based on hardware restrictions 124. For example, hardware implementation 128 may include recommendations for processors, memories, and/or network components based on hardware restrictions 124. When building a device that executes source code 126, the recommended hardware implementation 128 may be followed to reduce the carbon footprint associated with executing source code 126.

In certain embodiments, model 120 may include a logit layer 210. Logit layer 210 may be the last layer of a neural network that makes output predictions. Model designer 110 may trim and/or make logit layer 210 more efficient to further reduce the carbon footprint associated with executing the machine learning application. Model designer 110 may retrieve and use usage statistics 122B from usage database 108 to make logit layer 210 more efficient. For example, model designer 110 may determine, based on usage statistics 122B, that certain portions of logit layer 210 are infrequently used. As a result, model designer 110 may remove those portions of logit layer 210. As another example, model designer 110 may replace those portions of logit layer 210 with a more simplistic but less accurate prediction models. As a result, when those portions of logit layer 210 are executed, the amount of computing resources consumed may be reduced at the cost of accuracy. Because those portions of logit layer 210 are infrequently used, the impact on the overall accuracy of the machine learning application is minimized. In this manner, the carbon footprint of the machine learning application is further reduced.

Model designer 110 may edit source code 126 to reflect the changes to logit layer 210. For example, if a certain portion of logit layer 210 is removed, source code 126 may be changed to remove that portion of the logit layer 210. As another example, if certain portions of logit layer 210 are replaced by a more efficient version of those portions of logit layer 210, model designer 110 may edit certain portions of source code 126 associated with those replaced portions of logit layer 210. Model designer 110 may replace those portions of source code 126 with different source code 126 that approximate the portions of logit layer 210 that are being replaced. The approximation may be more efficient when executed but produce less accuracy that is acceptable within the parameters of the machine learning application.

In particular embodiments, model designer 110 may validate source code 126 before allowing source code 126 to be executed. For example, model designer 110 may perform test executions of source code 126 against test data to determine if source code 126 fulfills the requirements within document 116 and/or features 118. If source code 126 does not fulfill the requirements of document 116 and/or features 118, model designer 110 may continue building source code 126 and/or training model 120 until source code 126 fulfills the requirements of document 116 and/or features 118. If source code 126 fulfills the requirements of document 116 and features 118, model designer 110 may push source code 126 to a production environment for a full-scale execution.

FIG. 3 is a flowchart illustrating a method 300 for generating models 120 using the system 100 of FIG. 1. Generally, model designer 110 performs the steps of method 300. In particular embodiments, by performing method 300, model designer 110 reduces the carbon footprint associated with executing source code 126 for a machine learning application.

Model designer 110 begins by parsing the document 116 to extract features 118 in step 302. Document 116 may describe the requirements for a machine learning application. Features 118 may include text 202, tables 204, graphs 206, and/or images 208 that describe the requirements of a machine learning application. In step 304, model designer 110 generates source code 126 for a machine learning model 120 based on the extracted features 118. The source code 126, when executed, may perform the functions of the machine learning application according to the requirements described in document 116 and/or features 118. In step 306, model designer 110 retrieves computing statistics 122A from a usage database 108. The computing statistics 122A may provide insight into the amount of computing resources that are consumed when executing certain portions of machine learning applications. These computing statistics 122A may be tracked from previous machine learning applications.

Model designer 110 determines a hardware restriction 124 based on computing statistics 122A in step 308. Hardware restrictions 124 may limit the amount of processor memory and/or network resources used when executing certain portions of source code 126. In step 310, model designer 110 adds the hardware restrictions 124 to the source code 126. In this manner, when certain portions of source code 126 are executed, the hardware restrictions 124 are enforced. In this manner, the functionality and efficiency of executing certain portions of source code 126 are preserved while reducing the computing resources consumed when executing source code 126. In this manner, the carbon footprint associated with executing source code 126 is reduced.

Modifications, additions, or omissions may be made to method 300 depicted in FIG. 3. Method 300 may include more, fewer, or other steps. For example, steps may be performed in parallel or in any suitable order. While discussed as ATM exception handler 108 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory; and
a hardware processor communicatively coupled to the memory, the hardware processor configured to:
parse a document to extract features of a machine learning model;
generate source code for the machine learning model based on the extracted features;
retrieve, from a database, computing statistics for executing previous machine learning models, wherein the computing statistics track consumption of computing resources by different machine learning models;
determine, based on the computing statistics, a hardware restriction for a portion of the source code;
add the hardware restriction to the portion of the source code; and
implement the hardware restriction to limit one or more of processor usage and memory usage when the portion of the source code is executed.

2. The apparatus of claim 1, wherein the hardware processor is further configured to:
determine, based on usage statistics, a first portion of a logit layer of the machine learning model that is used less than a second portion of the logit layer; and
remove a second portion of the source code that implements the first portion of the logit layer.

3. The apparatus of claim 2, wherein the hardware processor is further configured to generate second source code to approximate the first and second portions of the logit layer.

4. The apparatus of claim 1, wherein the extracted features include one or more of a table and a graph.

5. The apparatus of claim 1, wherein the hardware processor is further configured to validate that the source code fulfills the extracted features before the source code is deployed.

6. The apparatus of claim 1, wherein the hardware processor is further configured to generate, based on the computing statistics, a recommended hardware implementation for executing the source code.

7. A method comprising:
parsing, by a hardware processor communicatively coupled to a memory, a document to extract features of a machine learning model;
generating, by the hardware processor, source code for the machine learning model based on the extracted features;
retrieving, by the hardware processor and from a database, computing statistics for executing previous machine learning models, wherein the computing statistics track consumption of computing resources by different machine learning models;
determining, by the hardware processor and based on the computing statistics, a hardware restriction for a portion of the source code;
adding, by the hardware processor, the hardware restriction to the portion of the source code; and
implementing the hardware restriction to limit one or more of processor usage and memory usage when the portion of the source code is executed.

8. The method of claim 7, further comprising:
determining, by the hardware processor and based on usage statistics, a first portion of a logit layer of the machine learning model that is used less than a second portion of the logit layer; and
removing, by the hardware processor, a second portion of the source code that implements the first portion of the logit layer.

9. The method of claim 8, further comprising generating, by the hardware processor, second source code to approximate the first and second portions of the logit layer.

10. The method of claim 7, wherein the extracted features include one or more of a table and a graph.

11. The method of claim 7, further comprising validating, by the hardware processor, that the source code fulfills the extracted features before the source code is deployed.

12. The method of claim 7, further comprising generating, by the hardware processor and based on the computing statistics, a recommended hardware implementation for executing the source code.

13. A system comprising:
a database; and
a model designer comprising a hardware processor communicatively coupled to a memory, the hardware processor configured to:
   parse a document to extract features of a machine learning model;
   generate source code for the machine learning model based on the extracted features;
   retrieve, from the database, computing statistics for executing previous machine learning models, wherein the computing statistics track consumption of computing resources by different machine learning models;
   determine, based on the computing statistics, a hardware restriction for a portion of the source code;
   add the hardware restriction to the portion of the source code; and
   implement the hardware restriction to limit one or more of processor usage and memory usage when the portion of the source code is executed.

14. The system of claim 13, wherein the hardware processor is further configured to:
   determine, based on usage statistics, a first portion of a logit layer of the machine learning model that is used less than a second portion of the logit layer; and
   remove a second portion of the source code that implements the first portion of the logit layer.

15. The system of claim 14, wherein the hardware processor is further configured to generate second source code to approximate the first and second portions of the logit layer.

16. The system of claim 13, wherein the extracted features include one or more of a table and a graph.

17. The system of claim 13, wherein the hardware processor is further configured to validate that the source code fulfills the extracted features before the source code is deployed.

* * * * *